May 1, 1928. 1,668,228
F. G. BREMER
BUMPER STRUCTURE
Filed Dec. 6, 1927 3 Sheets-Sheet 1
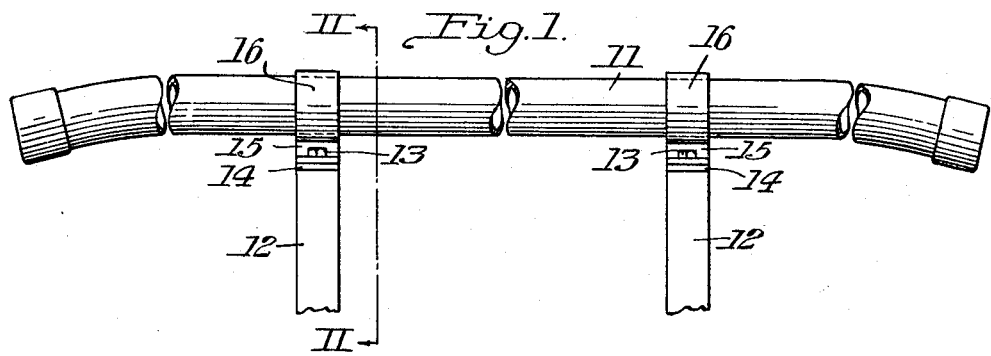
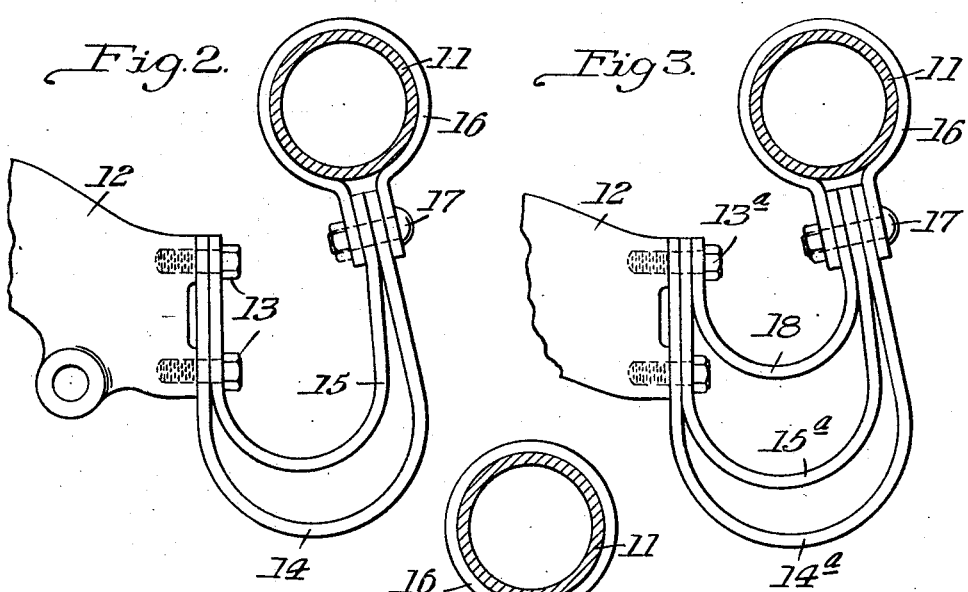
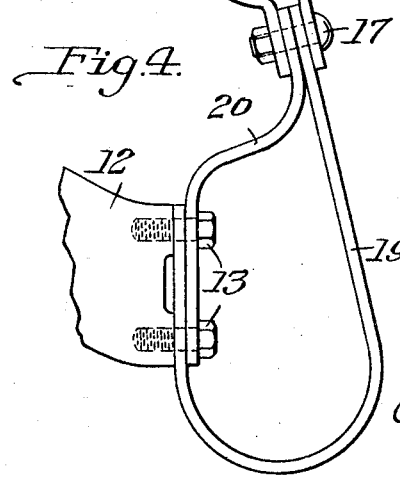
INVENTOR
Frederick G. Bremer
By Archworth Martin,
Attorney.

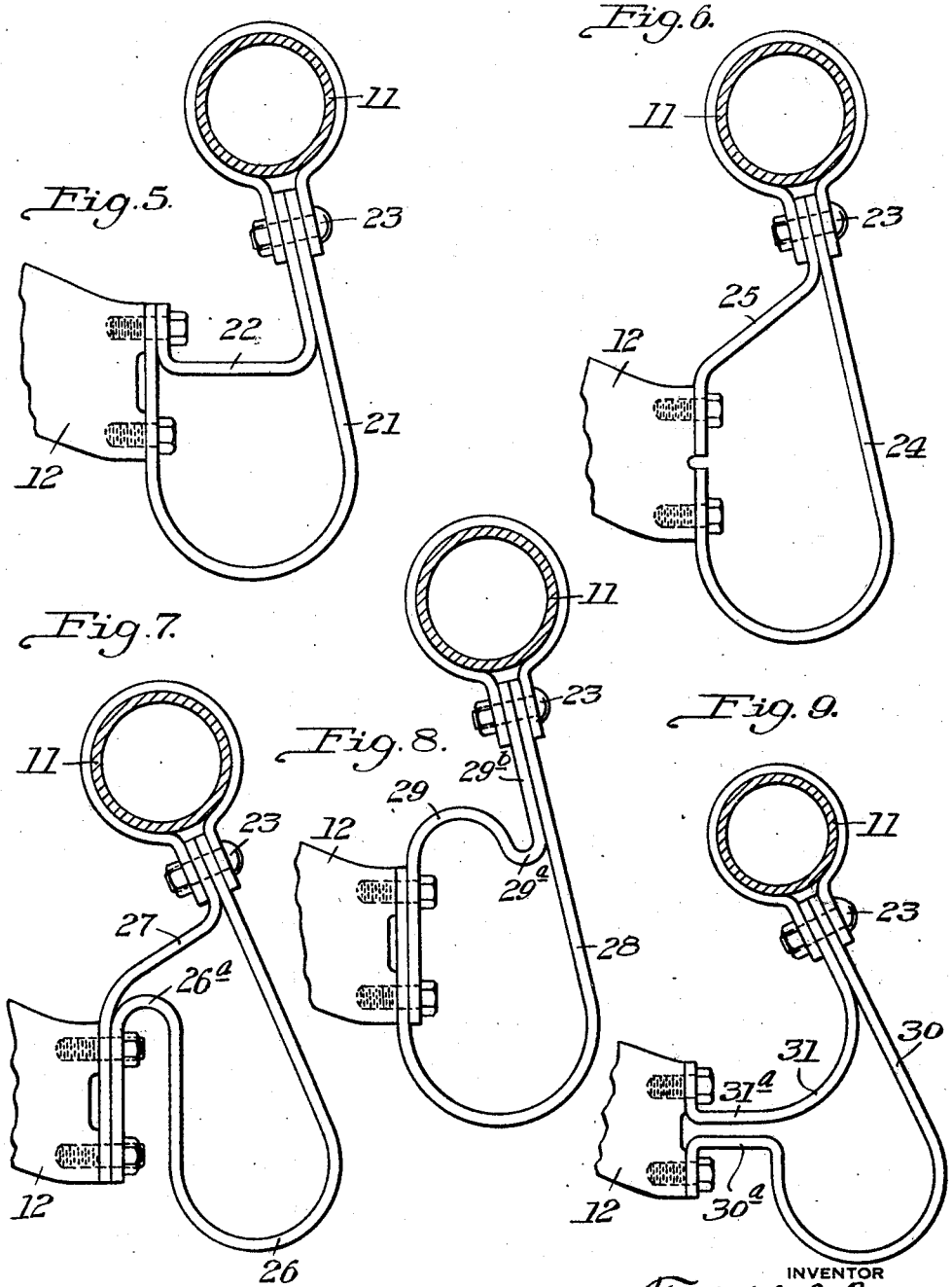

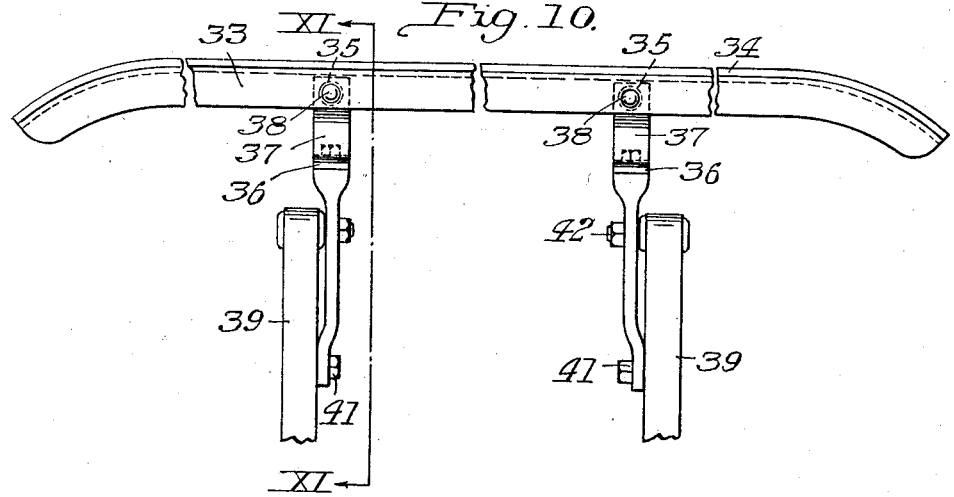
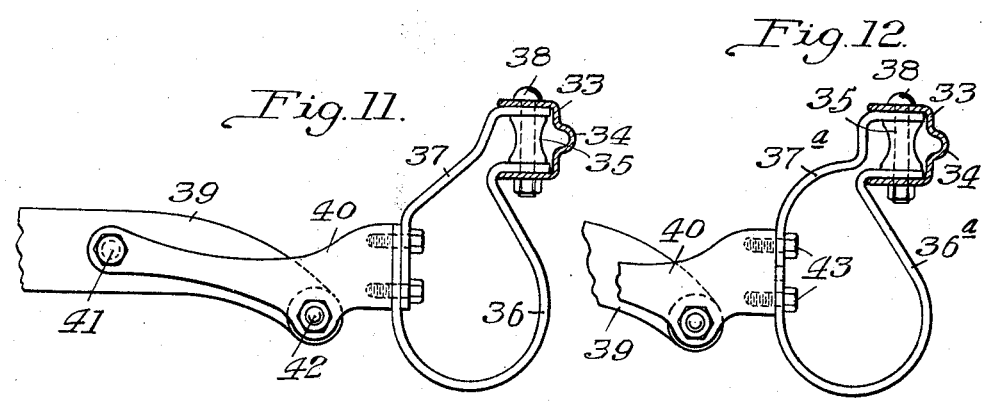
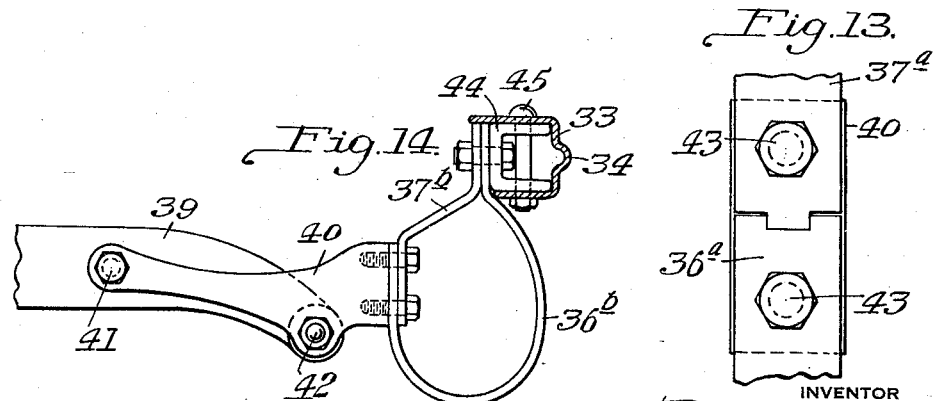

Patented May 1, 1928.

1,668,228

UNITED STATES PATENT OFFICE.

FREDERICK G. BREMER, OF PITTSBURGH, PENNSYLVANIA, ASSIGNOR TO UNITED STATES CHAIN & FORGING COMPANY, OF PITTSBURGH, PENNSYLVANIA, A CORPORATION OF DELAWARE.

BUMPER STRUCTURE.

Application filed December 6, 1927. Serial No. 238,059.

My invention relates to automobile bumper structures such as are employed at the front and rear ends of motor vehicles for absorbing the force of impacts.

One object of my invention is to provide an improved manner of yieldably supporting the impact bars.

Another object of my invention is to provide an improved form of buffer springs for automobile bumpers.

Still another object is to provide an improved manner of connecting buffer springs or other bar supports to the impact bars.

Some of the forms which my invention may take are shown in the accompanying drawing, wherein Figure 1 is a fragmentary plan view of a bumper structure mounted upon the forward portion of a vehicle frame; Fig. 2 is a view, on an enlarged scale, taken on the line II—II of Fig. 1; Figs. 3, 4, 5, 6, 7, 8 and 9 are views similar to Fig. 2, but showing various modifications of the device of Figs. 1 and 2; Fig. 10 shows a modification of the structure of Fig. 1, involving a different form of bumper bar and another form of device for attaching it to a vehicle frame; Fig. 11 is a view taken on the line XI—XI of Fig. 10; Fig. 12 is a view, similar to Fig. 11, but showing another form of buffer spring; Fig. 13 is a rear elevational view of a portion of the buffer springs of Fig. 12, and Fig. 14 is a view showing still another form of buffer spring and another manner of attaching the same to a channel bar.

This invention comprises modifications of the devices shown in my co-pending applications, Serial No. 207,178, filed July 20, 1927, and Serial No. 208,493, filed July 26, 1927, and relates more particularly to an arrangement of supplementary or reinforcing buffer springs in addition to the curved buffer springs that are commonly employed to support impact bars, and to means for attaching the same to a vehicle frame.

Referring more particularly to Figs. 1 and 2, I show an impact bar 11 that is of circular form in cross section and which is connected to the forward ends of vehicle frames 12 that may be of the usual form, except that they are flattened at their forward ends and tapped for the reception of screws 13, as shown more clearly in Fig. 2.

The screws 13 serve as means for attaching the main buffer springs 14 and the supplementary buffer springs 15 to the frame members 12. The buffer springs 14 and 15 are of leaf or strap-like form and curved through arcs of different radii, as shown in Fig. 2, the outer ends thereof being brought into engagement and connected to the impact bar 11 by means of collars 16 whose ends are drawn toward one another by bolts 17, in order to clamp the collars upon bar 11, and to clamp the outer ends of the springs 14 and 15. Suitable holes are provided in the springs 14 and 15 for the bolts 13 and 17, and the bolts 17 pass through the ends of the collars 16.

The foregoing arrangement constitutes a simple and effective manner of connecting the impact bar 11 and the buffer springs 14 and 15 together and to the vehicle frame. The spring member 15 not only supplements the yielding resistance offered by the spring 14 upon the bar 11, but also serves to brace the same against excessive distortion, particularly in view of the fact that at its outer end the spring 15 has abutting engagement with the outer end of the spring 14.

In Fig. 3, I have shown still another arrangement, wherein the springs 14$^a$ and 15$^a$, which correspond to the springs 14 and 15 have their yielding resistance supplemented by, and are yieldably braced by a third spring member 18, which, by reason of its disposition in a higher plane, exerts a greater bracing effect than in the case of the leaf 15, and which is attached to the vehicle frame 12 merely by the upper screw 13$^a$.

Referring to Fig. 4, I show buffer springs 19 and 20 of still another form. In this arrangement, the spring 19 corresponds somewhat to the spring 14 of Fig. 2, but throughout their points of attachment to the vehicle frame 12, the springs 19 and 20 both extend in generally opposite directions. The spring 20 by reason of the fact that it extends in a generally upward direction serves, in addition to supplementing the resistance to bending of the spring 14 through impacts against the bar 11 in a horizontal direction, to more effectively resist downward thrusts on the impact bar and hence prevent deformation of the spring 19 in a downward direction and to more effectively maintain the impact bar 11 in its proper horizontal plane when it is subjected to thrusts.

The structure of Fig. 4, by reason of the form and position of the spring 20, permits the employment of lighter gage material in the formation of the spring 19 for withstanding a given weight of impact against the bar 11 than if such strap 19 were employed alone, or were supplemented merely by an additional spring that is curved in the same general direction. For instance, instead of permitting the bar 19, under impacts, to merely flex backwardly about its least resistant portion, the bracing effect of the member 20 produces a pivot-like action at the outer end of said spring so that there will be a tendency for the spring 19 to be turned bodily in a counter-clockwise direction about such pivotal point, which movement will be yieldably resistant by the lower looped portion of the spring 19, while in addition to this yieldable resistance, the spring 19 will offer a degree of resistance to bending movement that occurs through rearward deflection of the upper end of the spring 20.

Referring now to Fig. 5, the impact bar 11 is connected to the vehicle frame by buffer springs 21 and 22, the spring 21 being of approximately the form of the springs 14 and 19 of Figs. 2 and 4. In this latter form of device, the mid portion of the spring 22 functions somewhat as a strut member, as in the case of the spring 20, but is of shorter length and at its outer portion extends parallel to and in abutting relation to the upper end of the spring 21, for some distance below the clamping bolt 23. Here again, the buffer springs may be formed of lighter material than in the case of buffer springs arranged as shown in Fig. 2, also less material is required than in the case of the structures of Figs. 2 and 4, because the spring 22 is shorter and is attached to the frame by a single screw instead of being held in place by two screws.

In Fig. 6, I have shown a structure which functions somewhat after the manner of the structure of Fig. 4, but wherein a modified form of attaching means for the buffer springs 24 and 25 is employed, the flattened inner end of each spring being of shorter length than the flattened ends of the springs 19 and 20, so that each extends only across substantially one-half the frame end and is held in place by a single screw.

In Fig. 7, I show a structure wherein a lower buffer spring 26 is recurved at its inner end, so that its inner extremity extends downwardly instead of upwardly as in the case of the spring 19 of Fig. 4. This arrangement not only produces an additional yielding effect, resulting from the recurved portion 26ª, but the end of the spring is directed downwardly, producing a smoother and more finished effect to the structure, when viewed from above, than if such spring end extended upwardly as in Fig. 4.

In Fig. 8, the buffer spring 28 corresponds, and is similar in form to the spring 19 of Fig. 4, but the supplementary buffer spring 29 is provided with an additional bend 29ª that renders it less rigid to bending stresses than the springs 20 and 22 of Figs. 4 and 5, respectively, but which nevertheless has a co-operating flat portion 29ᵇ for supplementing resistance to bending forces imposed at the upper portion of spring 28, as in the case of the outer flattened portion of the spring 22.

Referring now to Fig. 9, the buffer springs 30 and 31 have their inner flattened ends turned in opposite directions and each secured to the vehicle frame by a single screw. The straight portions 30ª and 31ª of these members can be made of suitable lengths, in order to cause the impact bar 11 to be positioned at a desired distance to the front of the vehicle, without materially altering the yielding effect of the curved portions of these springs such as would occur if the straight portions 30ª and 31ª were dispensed with and the curved portions of the springs 14 and 15 of Fig. 2, for example, were lengthened or shortened in order to position the bar 11 at a desired distance forwardly of the vehicle frame.

Figs. 10 and 11 show a structure wherein the impact bar 33 is approximately of channel form in cross section, instead of tubular, as in the case of the bar 11 of Figs. 1 and 2. The bar 33 is provided with a bead 34 on its forward face that adds to the attractiveness thereof, and serves also to strengthen the bar. Spacing blocks 35 are disposed between the flanges of the bar 33 and between the outer ends of buffer springs 36 and 37. A bolt 38 extends through the flanges of the bar 33 and through each pair of arms 36—37 and one of the blocks 35 to tie such bars together.

The springs 36 and 37 function somewhat after the manner of the springs 24 and 25 of Fig. 6, but instead of being attached directly to the vehicle frames 39, are bolted to the forward ends of bracket arms 40. The rear ends of the bracket arms are secured to the frames 39 by bolts 41, while their intermediate lower portions are attached to the frame by the spring bolts 42, that pass therethrough.

In Fig. 12, the spring arms 36ª and 37ª correspond to the arms 36 and 37 of Fig. 11, but their inner ends, instead of overlapping, have abutting engagement and each end is attached to the bracket arm 40 by a single screw 43. The abutting ends of the springs 36ª and 37ª have interlocking engagement as shown more clearly in Fig. 13, in order that they will not have pivotal movement about the screws 13. It will, of course, be understood that the inner ends of these springs may have co-operating tongues and recesses of various other forms, for effecting interlocking engagement.

Referring now to Fig. 14, the springs 36ᵇ and 37ᵇ extend vertically at their outer ends instead of being bent horizontally, as in Figs. 11 and 12. The outer ends of each pair of springs 36ᵇ—37ᵇ are bolted to a spacing block 44 of channel form disposed between the flanges of the bar 33, a bolt 45 being provided for securing each block 44 to the bar 33.

I claim as my invention:—

1. Buffer spring structure comprising a yieldable member having its rear end portion extending in a vertical line, for attachment to the end of a frame member and which is curved intermediate its ends, and means for connecting the outer end of the yieldable member to an impact bar, the outer end of the yieldable member being flat and disposed in a plane that is transverse to the plane of its inner end.

2. Buffer spring structure comprising a yieldable member having its rear end portion extending in a straight line, for attachment to the end of a supporting member and which is curved intermediate its ends, and means for connecting the outer end of the yieldable member to an impact bar, the yieldable member being of a strap-like material and curved in a vertical plane, the outer end of the yieldable member being flat and disposed in a plane that is transverse to the plane of its inner end.

3. Buffer spring structure comprising a yieldable member that is curved in a vertical plane, means for attaching the forward and rear ends of said member to a support and an impact member respectively, and a yieldable buffer member connected at its ends to the said support and impact member respectively, a portion of the buffer member intermediate its points of connection extending in a direction generally opposite to the direction of an adjacent portion of the said yieldable member.

4. Buffer spring structure comprising a main spring member, curved intermediate its ends, means for attaching the inner end of said spring member to a vehicle frame, means for attaching the outer end of said spring to a bumper bar, and a yieldable buffer member connected at its inner end to the frame at a point above that at which the spring member is connected thereto and at its outer end connected to the outer end of said spring member, the buffer member being disposed entirely to one side of a horizontal line drawn between the points of connection to the frame.

5. Buffer spring structure comprising a spring member that is of curved form intermediate its ends, a yieldable buffer member that is non-parallel to the spring member, means for connecting the outer ends of said members, and means for connecting the inner ends of said members to a vehicle frame, the said inner end portions being flattened and disposed in parallel vertical planes.

6. Bumper structure comprising a yieldable member that is curved intermediate its ends, means for connecting the inner end of said member to a support, a yieldable buffer member, means for connecting the outer end of said buffer member to the outer end of the first-named member, and means for connecting the inner end of said buffer member to a support, at a point removed from the point of connection of the first-named member thereto, the buffer member being disposed mainly to one side of a line that is perpendicular to a line extending through said points of connection and the curved portion of the first-named member extending to the other side of said line.

7. Buffer spring structure comprising a main spring member that is curved intermediate its ends, a yieldable buffer, means for connecting the outer end of said spring member to a bumper bar, and means for connecting the inner ends of said spring member and buffer, at spaced points, to a supporting member, the buffer member being disposed mainly to one side of a line that is perpendicular to a line extending through said points of connection to the supporting member, and the spring member extending to the other side thereof.

8. The combination with a channel bar of buffer spring structure therefor, comprising spring arms whose outer ends are disposed in parallelism with the flanges of said bar and connected thereto, and whose inner ends are arranged for connection to a support.

9. The combination with a bumper bar of channel form, of a block disposed between the flanges of said channel and connected thereto, a spring arm having its outer end connected to said block, and means for connecting the inner end of said arm to a support.

10. Bumper structure comprising a bumper bar, a pair of spring arms, means for connecting the outer ends of said arms to said bar, the said arms being disposed in non-parallel relation with their inner extremities in abutting relation, and means for connecting the inner ends of said arms to a support.

11. Bumper structure comprising a bumper bar, a pair of spring arms, means for connecting the outer ends of said arms to said bar, the said arms being disposed in non-parallel relation with their inner extremities in proximity to one another, means for connecting each of said inner ends to a support and means interlocking said inner ends against relative movement.

12. Buffer spring structure comprising a pair of supporting arms, means for connecting an impact member to the outer ends of said arms, the inner ends of said arms extending in generally opposite directions, and a single bolt for connecting each inner end to a supporting member.

13. Buffer spring structure comprising a pair of supporting arms, means for connecting an impact member to the outer ends of said arms, the inner ends of said arms extending in generally opposite directions, and a single bolt for connecting each inner end to a supporting member, the said inner ends having abutting engagement.

14. Buffer spring structure comprising a pair of supporting arms, means for connecting an impact member to the outer ends of said arms, the inner ends of said arms extending in generally opposite directions, and a single bolt for connecting each inner end to a supporting member, the said inner ends being disposed in proximity to one another and having offset portions that inter-engage to prevent movement of said ends about their points of connection.

In testimony whereof I, the said FREDERICK G. BREMER, have hereunto set my hand.

FREDERICK G. BREMER.